United States Patent [19]

Lorenz

[11] Patent Number: 4,533,812
[45] Date of Patent: Aug. 6, 1985

[54] METHOD AND DEVICE FOR FINE PROFILING TOOLS COATED WITH SUPER-HARD MATERIALS

[75] Inventor: Manfred Lorenz, Coburg, Fed. Rep. of Germany

[73] Assignee: Kapp & Co. Werkzeugmaschinenfabrik, Coburg, Fed. Rep. of Germany

[21] Appl. No.: 461,157

[22] Filed: Jan. 26, 1983

[30] Foreign Application Priority Data

Jan. 28, 1982 [DE] Fed. Rep. of Germany ....... 3202697

[51] Int. Cl.³ .............................................. B23K 26/00
[52] U.S. Cl. ........................... 219/121 LH; 76/101 A; 76/DIG. 12; 219/121 LJ; 219/121 EJ
[58] Field of Search .................... 219/121 EJ, 121 ER, 219/121 PD, 121 PE, 121 LH, 121 LJ, 121 L, 121 LM; 82/1 C, DIG. 1; 76/DIG. 12, 101 A, 101 R

[56] References Cited

U.S. PATENT DOCUMENTS 2,861,166  11/1958  Caraill, Jr. ...................... 82/1 R X
3,499,136   3/1970  Nunnikhoven et al. ... 219/121 LJ X
4,417,124  11/1983  Benedite et al. .......... 219/121 LJ X Primary Examiner—C. L. Albritton
Attorney, Agent, or Firm—Becker & Becker, Inc.

[57] ABSTRACT

A method and device for fine profiling or shaping tools coated with super-hard material, for example cubic crystalline boron nitride or diamond, especially tools coated with a single layer and having a prescribed or predetermined profile or shape. The rotatably driven tool is profiled or shaped in the region of the cutting surface by a clustered electron or laser beam which is controlled in a course corresponding to the prescribed shape or contour of the tool, and is oriented tangential to the tool; the profiling is accomplished by vaporization of the crystal tips or points which project from the desired profile. The cutting surface may be roughened in conformity to the desired profile after the fine profiling or shaping thereof. The rotatably drivable tool, and the device which produces the electron or laser beam, are mounted in such a way that a relative movement can be carried out along a prescribed path or course between the tool and the electron or laser beam, which is oriented tangential to the tool.

9 Claims, 2 Drawing Figures

METHOD AND DEVICE FOR FINE PROFILING TOOLS COATED WITH SUPER-HARD MATERIALS

BACKGROUND OF THE INVENTION

The present invention relates to a method and a device for fine or precision profiling or shaping tools which are coated with super-hard materials, for example cubic crystalline boron nitride or diamond, especially tools having a prescribed profile or shape and coated with a single layer.

In addition to metallic milling tools or cutters, ceramic profile grinding discs or wheels, which must be trued or sharpened frequently as a consequence of wear, are used to produce workpieces having a complicated external or internal shape or contour, especially toothing of gears. Sharpening or truing devices are employed for this purpose either separately or arranged on the machine; the sharpening or truing tools of these devices are made of a high-strength metal alloy or of diamonds.

Recently, grinding tools are being employed to an increasing extent which have a metallic foundation or main body which is coated or layered with a super-hard material, for example with cubic crystalline boron nitride or diamond. These tools have a very great accuracy or precision, and a long service life, so that up to now a truing was dispensed with.

In the event machining is to be performed at extremely high accuracy with a tool coated with a super-hard material, it is necessary to finely profile the cutting surface of such tools in order to remove those portions of the super-hard material which project from the true or desired profile. Such a fine or precision profiling is necessary, for example, if accuracy in the range of a few microns is to be achieved with a tool coated with super-hard material. Such a fine profiling of tools coated with super-hard material has up to now met with failure because the known sharpening or truing tools did not have a sufficient hardness for the shaping or profiling operation.

It is therefore an object of the present invention to provide a method and a device for fine profiling tools which are coated with a super-hard material and have a prescribed profile or shape, while maintaining a very high accuracy relative to the prescribed profile or shape in an economical and feasible manner.

BRIEF DESCRIPTION OF THE DRAWING

This object, and other objects and advantages of the present invention, will appear more clearly from the following specification in connection with the accompanying drawing, in which.

SUMMARY OF THE INVENTION

The method of the present invention is characterized primarily in that the rotatably driven tool is shaped or profiled in the region of the cutting surface thereof by a clustered or focused electron or laser beam which is oriented or disposed tangential to the tool and is controlled in a course corresponding to the prescribed contour of the tool; the profiling is accomplished by vaporization of the crystal tips or points which project out of the ideal or desired profile.

Since with multi-layer coated tools, where a ceramic, metallic, or synthetic-resin bonding is employed between the metallic main body and the super-hard coating, it is possible that the bonding materials melt during the fine profiling or shaping of the present invention, and hence that the existing chip spaces between the crystals fill up, it is proposed according to a further feature of the inventive method to again roughen the cutting surface of the tool after the fine profiling or shaping in conformity with the desired profile. This roughing-up can be undertaken by an electrolytic roughening where multi-layer coated tools having metal bonding are used. Where tools having a ceramic or synthetic resin bonding are used, the roughening can be effected by employing a silicon carbide containing stone which is guided over the desired profile of the tool after the fine profiling or shaping.

The device of the present invention for carrying out the inventive method is characterized primarily in that the rotatably driven tool, and the device which produces the electron or laser beam, are mounted in such a way that a relative movement can be carried out along a prescribed path between the tool and the electron or laser beam, which is disposed or oriented tangential to the tool. The relative movement can occur on the one hand by moving the device which produces the high energy beam along a path or course, while the tool which is to be shaped or profiled rotates. On the other hand, it is possible to move the rotating tool along a curve which corresponds to the prescribed or predetermined shape or contour of the tool, while the device which produces the high-energy beam is stationary. The present invention makes it possible for the first time with a very high accuracy to profile or shape the cutting surface of tools coated with super-hard materials, and in particular using profiling or shaping devices which are practically free of wear.

DESCRIPTION OF A PREFERRED EMBODIMENT

Figure 1:
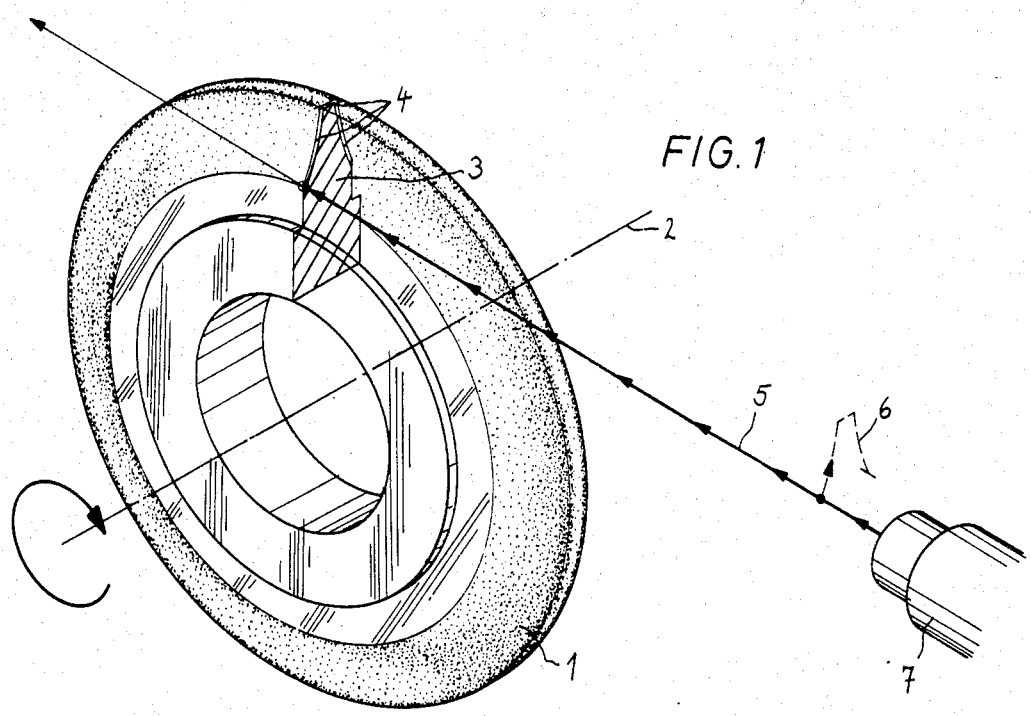
FIG. 1 is a perspective view illustrating one inventive embodiment for fine profiling or shaping a profile grinding disc by means of a high energy beam.

Referring now to the drawing in detail, FIG. 1 shows a profile grinding disc 1 which is rotatably mounted about an axis 2. The cross section of the grinding disc 1 is shown in the upper part of the disc. This cross section shows that the profile grinding disc 1 is made of a metallic foundation or main body 3 which is provided with a coating or layering 4 of super-hard material in the region of the cutting surface thereof. Examples of a super-hard material include diamond or cubic crystalline boron nitride.

Figure 2:
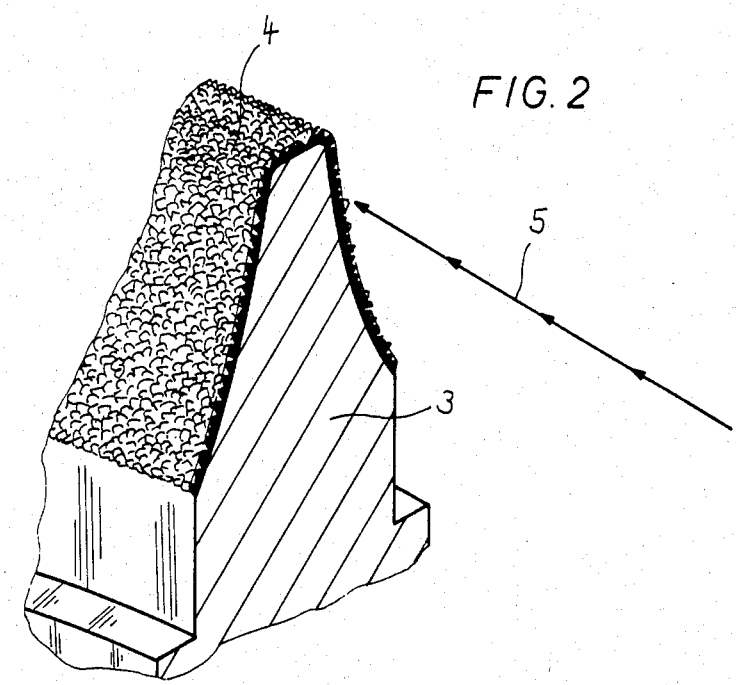
FIG. 2 is an enlarged fragmentary perspective cross sectional illustration of a segment of the grinding disc which is to be profiled or shaped.

As evident especially from the enlarged illustration of FIG. 2, tips or points of the crystals which form the super-hard material project from the indicated desired or ideal profile or shape, particularly with a single-layer coated main body 3. These crystal tips or points, which result in undesired inaccuracies during machining, are volatized or vaporized when, as shown in the drawing, a clustered or focused electron or laser beam 5 is disposed tangential to the rotating profile grinding disc 1 and is guided along the contour or the cutting surface. This cutting surface contour 6 is illustrated in FIG. 1.

The relative movement between the profile grinding disc 1 and the device 7, which generates the electron or laser beam 5, corresponds to the cutting surface contour 6 and can be effected by a controlled-path movement of either the profile disc 1 or of the device 7. Naturally, it is also possible to cause the relative movement by simultaneous movement of both the profile disc 1 and the device 7.

Although a roughening of the finely profiled or shaped cutting surface is not necessary with a main body 3 coated with only a single layer of super-hard material, with multi-layer coated tools there is possible that the bonding, which consists either of metal, synthetic resin, or ceramic material and holds the coating 4 upon the main body 3, melts partially during the fine profiling or shaping operation and accordingly fills up the chip spaces in the cutting surface. In this case, the cutting surface can be roughened after the fine profiling, and in particular either by electrolytic roughening if a metallic bonding is used, or by mechanical roughening, for example by employment of a silicon carbide stone, if ceramic materials or synthetic resin are used as a bonding.

The drawing shows that with the method described in the foregoing, tools having any contour, and coated with super-hard materials, can be profiled or shaped with a very high accuracy without subjecting the devices which perform this fine or precision profiling procedure to wear.

A fine profiling or shaping can be economically achieved, even for the super-hard cutting surface of a tool coated with diamond or boron nitride, by the inventive employment of a high energy beam formed, for example, by electron or laser beams, because the clustered or focused beam, which is disposed tangential to the tool, during its traversal or movement over the prescribed contour of the tool, while the latter rotates, vaporizes those crystal tips or points which project from the desired profile or shape of the tool. In this way, a surface accuracy within a few microns can be achieved even with single-layer coated tools. The method according to the present invention produces an accuracy unknown up to now, especially with single-layer coated tools which have only one layer or crystals on the surface of their metallic main body. These tools, that are galvanically coated, e.g. by electroplating, have very recently been of increasing importance.

The present invention is, of course, in no way restricted to the specific disclosure of the specification and drawing, but also encompasses any modifications within the scope of the appended claims.

What I claim is:

1. A method of precision profiling a tool which is coated with a super-hard material and has a prescribed outer contour, including a cutting surface, with some of the tips of the crystals of said coating projecting beyond said prescribed outer contour prior to said precision profiling; said method including the steps of:
    rotating said tool;
    generating a focused high energy beam;
    orienting said beam tangential to said tool; and
    moving said beam in a controlled path which corresponds to said prescribed outer contour of said tool to thereby profile said tool in the region of said cutting surface thereof by vaporizing said crystal tips which project beyond said prescribed outer contour.

2. A method according to claim 1, which includes the further step, subsequent to said profiling step, of roughening said cutting surface in conformity with said prescribed outer contour.

3. A device for precision profiling a rotatable tool which is coated with a super-hard material and has a prescribed outer contour, said device including a device which generates high energy beam tangential to said tool; said tool and said beam generating device being mounted in such a way that a relative movement is provided between them so that said beam is directed along a path which corresponds to said prescribed outer contour.

4. A method according to claim 1, wherein said generating a focused high energy beam involves an electron beam.

5. A method according to claim 3, wherein said generating a focused high energy beam involves a laser beam.

6. A method according to claim 4, which includes the further step, subsequent to said profiling steps, of roughening said cutting surface in conformity with said prescribed outer contour.

7. A method according to claim 5, which includes the further step, subsequent to said profiling step, of roughening said cutting surface in conformity with said prescribed outer contour.

8. A device according to claim 3, wherein said high energy beam is an electron beam.

9. A device according to claim 3, wherein said high energy beam is a laser beam.

* * * * *